(12) United States Patent
Baumann

(10) Patent No.: US 7,922,258 B2
(45) Date of Patent: Apr. 12, 2011

(54) SYSTEM FOR ATTACHING A WHEEL TO A MOTOR VEHICLE

(75) Inventor: Hans-Uwe Baumann, Stuttgart (DE)

(73) Assignee: Dr. ing. h.c. F. Porsche Aktiengesellschaft, Stuttgart (DE)

( * ) Notice: Subject to any disclaimer, the term of this patent is extended or adjusted under 35 U.S.C. 154(b) by 136 days.

(21) Appl. No.: 12/339,171

(22) Filed: Dec. 19, 2008

(65) Prior Publication Data

US 2009/0160241 A1    Jun. 25, 2009

(30) Foreign Application Priority Data

Dec. 19, 2007   (DE) .......................... 10 2007 061 258

(51) Int. Cl.
*B60B 25/00* (2006.01)
(52) U.S. Cl. ................. 301/35.63; 301/111.01; 301/114
(58) Field of Classification Search ................... 301/6.1, 301/6.8, 35.621, 35.623, 35.627, 111.01, 301/114–117, 111.03, 111.04
See application file for complete search history.

(56) References Cited

U.S. PATENT DOCUMENTS

| | | | | |
|---|---|---|---|---|
| 1,465,958 A | | 8/1923 | Weeler | |
| 4,093,311 A | * | 6/1978 | Maus | ........................ 301/35.61 |
| 5,211,448 A | * | 5/1993 | Hayashi | ..................... 301/35.55 |
| 5,431,485 A | * | 7/1995 | Hayashi | ..................... 301/35.55 |
| 5,601,343 A | * | 2/1997 | Hoffken | ..................... 301/35.63 |
| 5,636,905 A | | 6/1997 | Pagacz | |
| 5,887,952 A | * | 3/1999 | Gandellini | ................. 301/35.63 |
| 6,089,674 A | * | 7/2000 | Whitman | ................. 301/111.01 |
| 6,106,076 A | | 8/2000 | Gandellini | |
| 7,445,413 B2 | | 11/2008 | Niederhageboeck | |

FOREIGN PATENT DOCUMENTS

| | | |
|---|---|---|
| DE | 3844169 A1 | 7/1990 |
| DE | 4315765 C1 | 9/1994 |
| DE | 10222107 B3 | 1/2004 |

OTHER PUBLICATIONS

German Search Report dated Dec. 9, 2008.

* cited by examiner

*Primary Examiner* — Jason R Bellinger

(57) ABSTRACT

A system for attaching a wheel to a motor vehicle, having a wheel hub which bears on a drive shaft stub of the motor vehicle and to which the wheel to be attached is attached by way of a central fastening element. On one section the central fastening element has an external thread, by way of which the bolt is screwed to an internal thread of a wheel hub stub of the wheel hub, a slotted cone interacting with the central fastening element in such a way that when attaching the central fastening element to the wheel hub the slotted cone can be pressed against the wheel. The slotted cone here being braced on an outer face of the wheel hub stub and entering into a frictional connection with the wheel hub stub.

11 Claims, 3 Drawing Sheets

SYSTEM FOR ATTACHING A WHEEL TO A MOTOR VEHICLE

CROSS-REFERENCE TO RELATED APPLICATION

This application claims the priority, under 35 U.S.C. §119, of German application DE 10 2007 061 258.5, filed Dec. 19, 2007; the prior application is herewith incorporated by reference in its entirety.

BACKGROUND OF THE INVENTION

Field of the Invention

The invention relates to a system for attaching a wheel to a motor vehicle. having a wheel hub which bears on a drive shaft stub of the motor vehicle and to which the wheel to be attached is attached by way of a central fastening element.

U.S. Pat. No. 6,106,076, issued to Giacomo Gandellini, discloses a system for attaching a wheel to a motor vehicle, in which the wheel to be attached is attached to a wheel hub of the motor vehicle by way of a central fastening element. According to this state of the art the central fastening element is embodied as a single nut, which by means of an internal thread is screwed onto an external thread of a section of the wheel hub. Interacting with the single nut is a contact element, which when attaching the single nut on the wheel hub is pressed against the wheel to be attached. Although the system disclosed by U.S. Pat. No. 6,106,076 in principle allows a central attachment of a wheel to a wheel hub of a motor vehicle, the connection of the wheel to the wheel hub affords insufficient rigidity. Furthermore, although the system according to U.S. Pat. No. 6,106,076 proposes an anti-theft safeguard it does not afford any locking safeguard against a wheel coming loose. In that prior art, the attachment of a brake disk furthermore presents difficulties. There exist, therefore, a need for a new system for attaching a wheel to a motor vehicle which will take account of the afore-mentioned aspects.

SUMMARY OF THE INVENTION

It is accordingly an object of the invention to provide a system for mounting a wheel to a motor vehicle which overcomes the above-mentioned disadvantages of the heretofore-known devices and methods of this general type and which provides for a new and improved system for attaching a wheel to a motor vehicle.

With the foregoing and other objects in view there is provided, in accordance with the invention, a system for attaching a wheel to a motor vehicle, the motor vehicle having an axle shaft stub and a wheel hub mounted thereto for attachment of the wheel, the system comprising:

a central fastening element having an external thread formed on one section thereof configured to mesh with an internal thread formed in a wheel hub stub of the wheel hub;

a slotted cone configured to interact with said central fastening element such that, when said central fastening element is attached to the wheel hub, said slotted cone presses against the wheel, and said slotted cone is braced on an outer face of the wheel hub stub and enters into a frictional connection with the wheel hub stub.

In other words, according to one aspect of the invention the objects are achieved by a system for attaching a wheel to a motor vehicle wherein the central fastening element has on one section an external thread, by means of which the central fastening element is screwed to an internal thread of a wheel hub stub of the wheel hub, a slotted cone interacting with the central fastening element in such a way that when attaching the central fastening element to the wheel hub the slotted cone can be pressed against the wheel, the slotted cone here being braced on an outer face of the wheel hub stub and entering into a frictional connection with the wheel hub stub.

According to the first aspect of the present invention the central fastening element is screwed by way of an external thread to an internal thread of the heel hub stub. Interacting with the central fastening element is a slotted cone, the cone, when attaching the central fastening element to the wheel hub stub being pressed against the wheel rim on the one hand and against the wheel hub stub on the other. In the process the slotted cone grips firmly on the wheel hub stub and establishes a frictional connection with the wheel hub. This serves to increase the rigidity of the wheel connection to the wheel hub stub and hence the quality of the wheel attachment to the motor vehicle.

In accordance with a preferred implementation, the slotted cone is rotatably attached to said central fastening element. Preferably, also, the slotted cone is permanently secured to said central fastening element.

In accordance with an added feature of the invention, there is provided a locking safeguard for securing the attached wheel to the wheel hub, said locking safeguard including a locking pin movably disposed between a first position, in which said locking pin locks said central fastening element, and a second position, in which said locking pin releases said central fastening element.

In addition, there may be provided driving pins fixedly connected to a brake disk and projecting at least partially into recesses formed in the wheel to be attached.

With the above an other objects of the invention in view there is provided, in accordance with a second aspect of the invention, a system for attaching a wheel to a motor vehicle, the motor vehicle having an axle shaft stub and a wheel hub mounted thereto for attachment of the wheel, the system comprising:

a central fastening element having an external thread formed on one section thereof configured to mesh with an internal thread formed in a wheel hub stub of the wheel hub;

a locking safeguard for securing the attached wheel to the wheel hub, said locking safeguard including a locking pin movably disposed between a first position, in which said locking pin locks said central fastening element, and a second position, in which said locking pin releases said central fastening element.

In other words, according to the second aspect, the central fastening element has on one section an external thread, by means of which said central fastening element is screwed to an internal thread of a wheel hub stub of the wheel hub. The wheel is securely attached to the wheel hub by way of a locking safeguard, the locking safeguard comprising a locking pin, which in a first position locks the central fastening element and in a second position releases it.

That is, the second aspect of the present invention proposes a locking safeguard, which comprises a locking pin, the locking pin interacting with the central fastening element in such a way that the locking pin in a first position locks the central fastening element and in a second position releases it. This provides a locking safeguard for the wheel attached to the wheel hub which will prevent the central fastening element accidentally working loose from the wheel hub and thereby increases the security of the system for central attachment of the wheel to the motor vehicle.

In accordance with an added feature of the invention, the locking pin has an external toothing, configured to mesh with an internal toothing of said central fastening element and to lock said central fastening element in the first position, and to become disengaged from the internal toothing of said central fastening element and to release said central fastening element in the second position.

In accordance with an additional feature of the invention, the external toothing of said locking pin and said internal toothing of said central fastening element form a fine toothing system.

In accordance with an another feature of the invention, the locking safeguard includes a carrier and a spring element accommodated in said carrier, and wherein said locking pin of said locking safeguard is supported for linear displacement in said carrier of said locking safeguard, said spring element pressing said locking pin into the first position, and said locking pin being displaceable from the first position into the second position against a spring force exerted by said spring element.

In accordance with a further feature of the invention, the locking pin of said locking safeguard is securely attached to said carrier of said locking safeguard. Preferably, the carrier of said locking safeguard has an external toothing configured to mesh with an internal toothing of the wheel hub. In an advantageous implementation, the external toothing of said carrier and said internal toothing of the wheel hub form a coarse toothing system with torsional play.

In accordance with again an added feature of the invention, there is provided an anti-theft safeguard interacting with said locking pin of said locking safeguard.

As above, the second aspect may also include a slotted cone configured to interact with said central fastening element such that, when said central fastening element is being attached to the wheel hub, said slotted cone presses against the wheel, and said slotted cone is braced on an outer face of the wheel hub stub and enters into a frictional connection with the wheel hub stub.

Further, the second aspect of the invention may be formed with driving pins fixedly connected to a brake disk and projecting at least partially into recesses formed in the wheel to be attached.

With the above and other objects in view there is provided, in accordance with a third aspect of the invention, a system for attaching a wheel to a motor vehicle, the motor vehicle having an axle shaft stub and a wheel hub mounted thereto for attachment of the wheel, the system comprising a central fastening element for attaching the wheel to the wheel hub of the motor vehicle; and driving pins fixedly connected to a brake disk and projecting at least partially into recesses formed in the wheel to be attached.

In other words, according to the third aspect of the invention there are provided driving pins fixedly connected to a brake disk and extending at least partially into recesses in the wheel to be attached. These driving pins are proposed for a simple attachment of a brake disk to the wheel of the motor vehicle to be attached to the wheel hub.

In accordance with a concomitant feature of the invention, each driving pin is fixedly connected by way of a sleeve and a bolt to the brake disk, each sleeve, each bolt and each driving pin extending at least partially into a recess in a wheel rim of the wheel.

Those of skill in the art will appreciate that the three aspects of the invention may be used in a combination of two aspects or in a combination involving all three aspects.

Other features which are considered as characteristic for the invention are set forth in the appended claims.

Although the invention is illustrated and described herein as embodied in a system for attaching a wheel to a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 2:
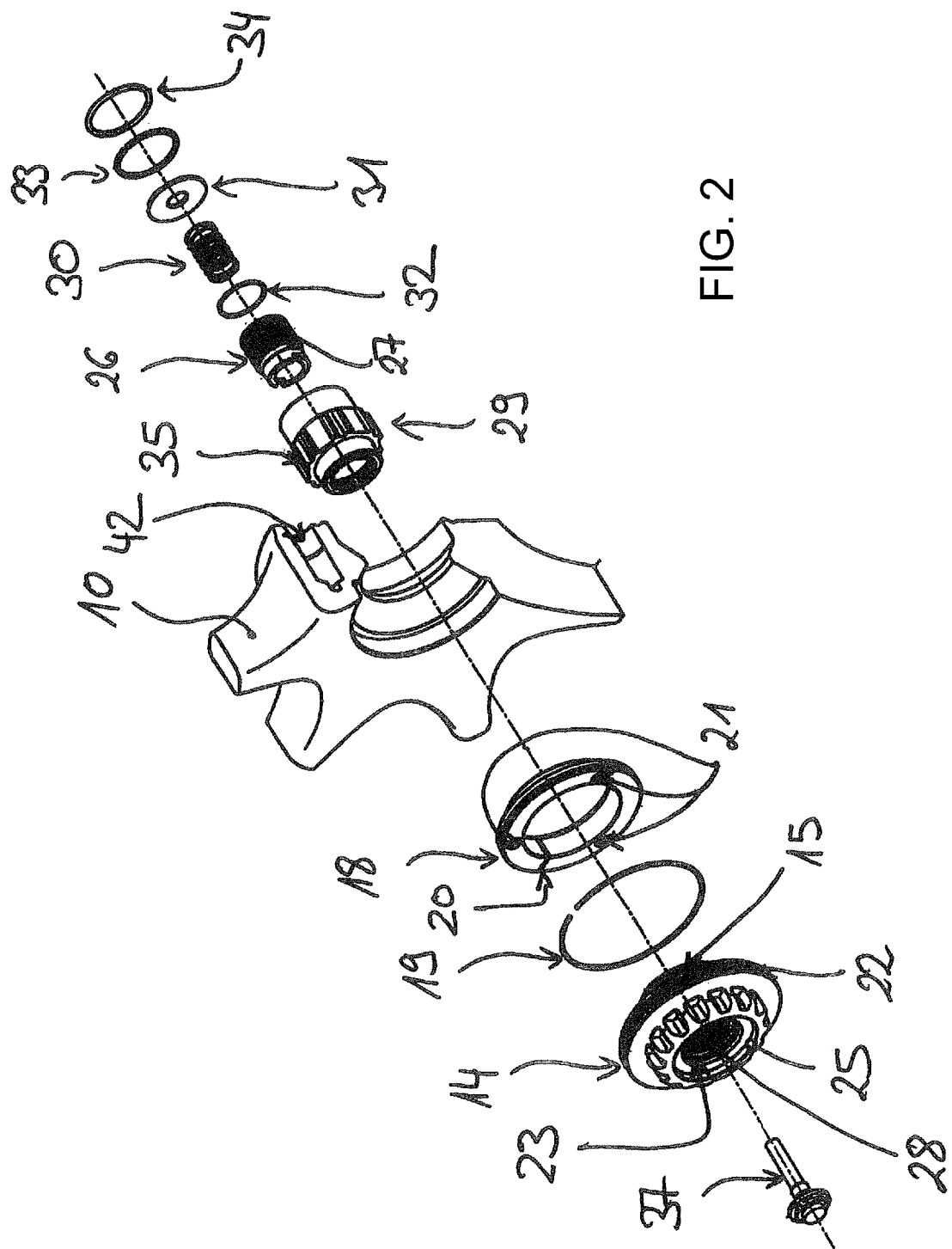
FIG. 2 is an exploded view of a first set of components of the system according to the invention in FIG. 1.
Figure 3:
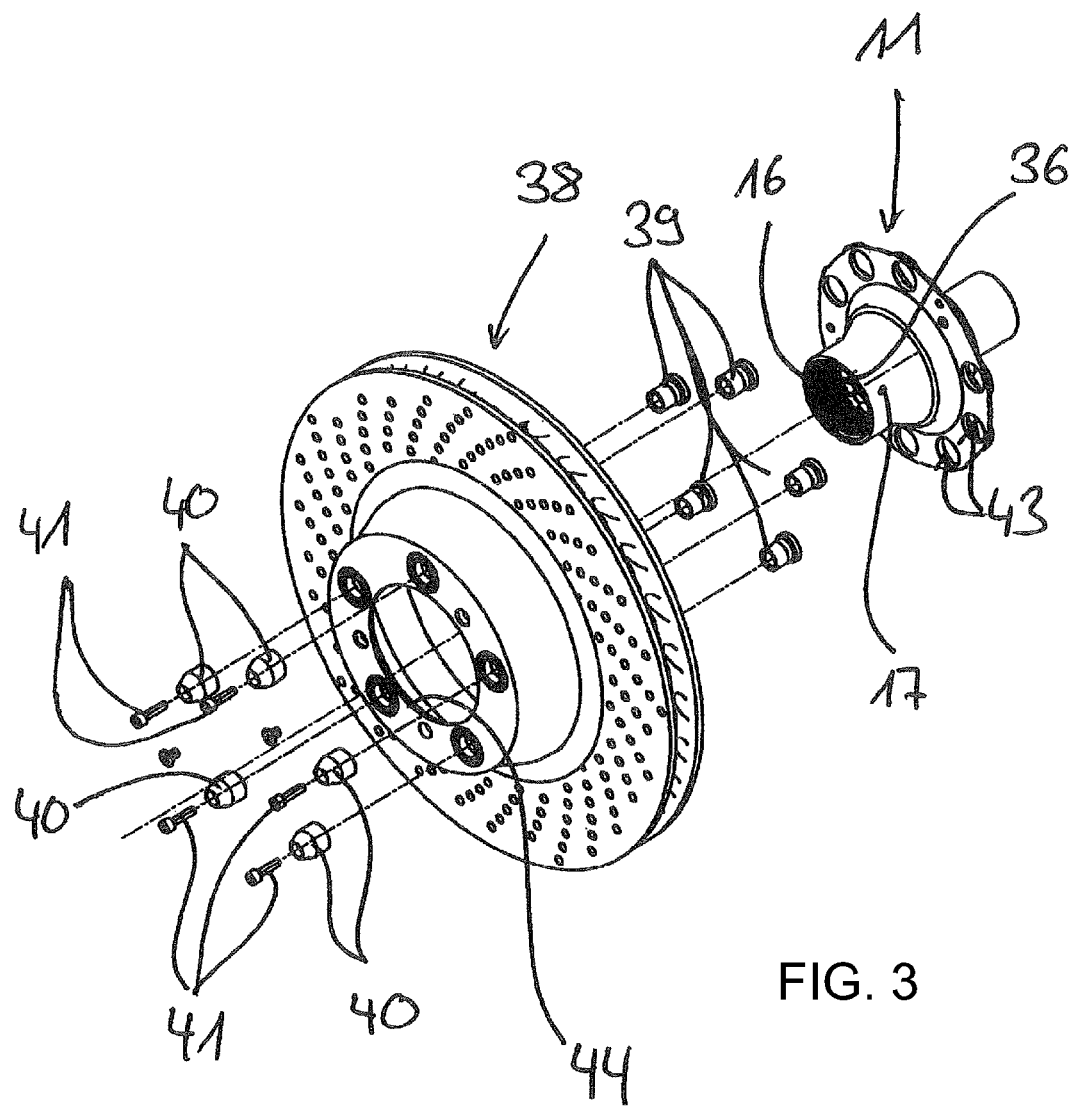
FIG. 3 is an exploded view of a second set of components of the system according to the invention in FIG. 1.

The apparatus according to the invention is a system for mounting a wheel to a motor vehicle. Referring now to the figures of the drawing in detail and first, particularly, to FIG. 1 thereof, the cross section through the system according to the invention, uses all three aspects of the present invention in combination with one another. FIGS. 2 and 3 each show exploded diagrams of individual components of the system according to the invention.

Figure 1:
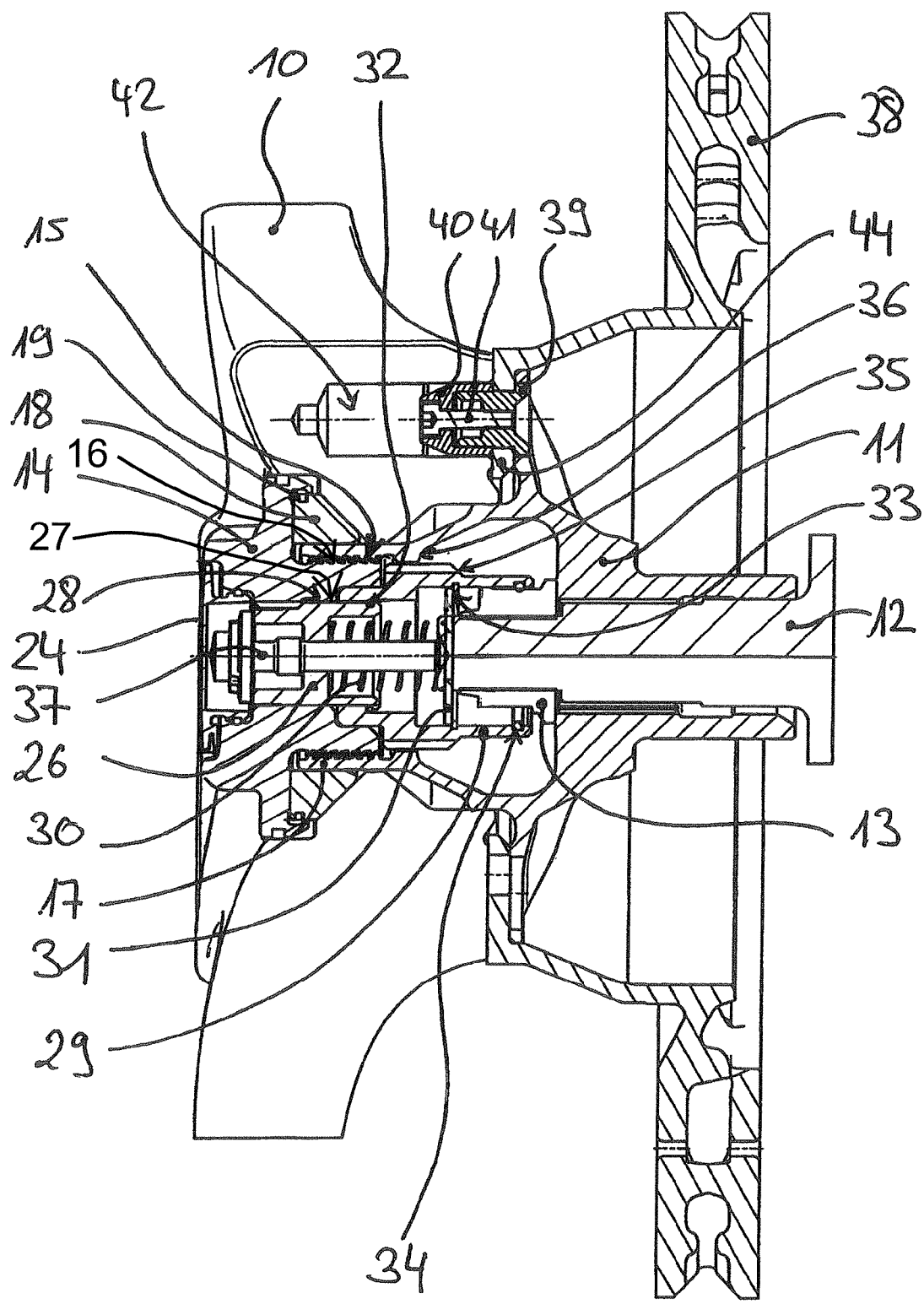
FIG. 1 is a cross section through a system according to the invention for attaching a wheel to a motor vehicle.

FIG. 1 shows a motor vehicle wheel 10 to be attached to a wheel hub 11, the wheel hub 11 being attached to a drive shaft stub 12 of the motor vehicle and being fixed on the drive shaft stub 12 by means of a lock nut 13.

A central fastening element 14 serves for the central attachment of the wheel 10 to be attached to the wheel hub 11. The central fastening element 14 has an external thread 15, by way of which the central fastening element 14 meshes with an internal thread 16 of a wheel hub stub 17 of the wheel hub 11.

A slotted cone 18 interacts with the central fastening element 14. The slotted cone 18 is securely attached to the central fastening element 14 by way of a securing element 19. According to FIG. 2 the slotted cone 18 has a slot 20, although it may also have more than one slot. When screwing the central fastening element 14 to the wheel hub stub 17, the slotted cone 18 can be pressed against the wheel 10 to be attached on the one hand and against an outer face of the wheel hub stub 17 on the other, the slotted cone 18 in the process establishing a frictional connection with the wheel hub stub 17. This serves to increase the rigidity of the connection of the wheel 10 to the wheel hub 11. The wheel hub stub 17 can accordingly be used to support the wheel 10 to be attached.

The term "frictional connection" is used in a sense of a force lock, as opposed to a form lock, or positive connection. A form lock is defined by the interacting shapes of two or more elements, to define structural parts that oppose a given relative movement, while a force lock, or friction lock, opposes their relative movement by way of friction (typically, static friction). By way of example, a threaded bolt meshing connection makes use of a form lock in its axial direction (i.e., the thread ridges engage into the opposing thread troughs), while its rotation is opposed by a force lock.

As already mentioned, the slotted cone 18 is securely connected by a securing element 19 to the central fastening element 14, the slotted cone 18 being able to turn in relation to the central fastening element 14. The connection between the central fastening element 14 and the slotted cone 18 is preferably embodied as a snap connection and the securing element 19 as a wire ring.

So-called grease reservoir holes 21 (cf. FIG. 2), which serve to receive lubricating grease for long-term lubrication of a highly stressed friction surface between the central fastening element 14 and the slotted cone 18, are introduced into the slotted cone 18. A sealing ring (not shown) may be inserted into a groove 22 in the central fastening element 14, in order to seal the central fastening element 14 off from the wheel 10 and to prevent any ingress of water and/or dirt between the wheel 10 and the central fastening element 14.

A cover 24, which is sealed off from the central fastening element 14 by a sealing ring (not shown), is clipped into an end recess 23 in the central fastening element 14 in order to seal off the recess 23. This serves to prevent water and/or dirt getting inside the central fastening element 14. A pocket or notch 25 is introduced into the central fastening element 14 in the area of the recess 23, so as to be able to remove the cover 24 from the opening 23 of the central fastening element 14 by applying a tool.

The wheel 10 attached to the wheel hub 11 by means of the central fastening element 14 is securely attached to the wheel hub 11 by means of a locking safeguard, the locking safeguard comprising a locking pin 26, which in a first position locks the central fastening element 14 and in a second position releases it. The locking pin 26 of the locking safeguard has an external toothing 27, which interacts with an internal toothing 28 of the central fastening element 14. In the first position, in which the locking pin 26 locks the central fastening element 14, the external toothing 27 of the locking pin 26 engages with the internal toothing 28 of the central fastening element 14. In the second position, on the other hand, in which the locking pin 26 releases the central fastening element 14, the external toothing 27 of the locking pin 26 is disengaged from the internal toothing 28 of the central fastening element 14. The external toothing 27 of the locking pin 26 and the internal toothing 28 of the central fastening element 14 form a fine toothing system.

The locking pin 26 of the locking safeguard is accommodated in a carrier 29 of the locking safeguard together with a spring element 30 and a lock washer 31. The spring element 30 is braced against the locking pin 26 on the one hand and the lock washer 31 on the other. Under its spring force the spring element 30 presses the locking pin 26 into the first position shown in FIG. 1, in which the locking pin 26 locks the central fastening element 14. Against the spring force provided by the spring element, the locking pin 26 is linearly displaceable in the carrier 29 into the second position, in which the locking pin 26 releases the central fastening element 14. The locking pin 26 is securely attached to the carrier 29 by means of a securing element 32, preferably embodied as a wire ring. The lock washer 31 is likewise securely attached to the carrier 29, again preferably by means of a securing element 33 embodied as a wire ring.

As can best be seen from FIG. 1, the carrier 29 of the locking safeguard is designed in such a way that it encompasses the lock nut 13 of the wheel hub bolting and thus additionally centers itself. The carrier 29 is sealed off from the lock nut 13 by a sealing ring 34, the sealing ring 34 preventing any rattling of the carrier 26 of the locking safeguard on the lock nut 13 of the wheel hub bolting and preventing any loss when the central fastening element 14 is detached.

The carrier 29 of the locking safeguard has an external toothing 35, which interacts with an internal toothing 36 of the wheel hub 11. The external toothing 35 of the carrier 29 of the locking safeguard and the internal toothing 36 of the wheel hub 11 form a coarse toothing system with some torsional play, the torsional play preferably being in the order of 2° to 3°. Such a torsional play of the coarse toothing system between the external toothing 35 of the carrier 29 and the internal toothing 36 of the wheel hub 11 makes it possible, through turning of the carrier 29, to compensate for a tooth-on-tooth position, which may occur between the central fastening element 14 and the locking pin 26 after tightening of the central fastening element 14, so that the external toothing 27 of the locking pin 26 can mesh correctly with the internal toothing 28 of the central fastening element 14.

The carrier 29 and the locking pin 26 of the locking safeguard are preferably made from extruded profiles. In the first position, in which the locking pin 26 locks the central fastening element 14, the pin is preferably flush with a defined edge in the central fastening element 14, in order thereby to indicate the set reference position of the first position.

In the area of a leading pilot, the locking pin 26 of the locking safeguard is preferably formed in such a way that when the central fastening element 14 is fitted it is pre-centered, so as to position the central fastening element 14 better in the wheel hub 11.

Interacting with the locking safeguard is an anti-theft safeguard, which in the exemplary embodiment shown is formed by a locking screw 37. According to FIG. 1 the locking screw 37 engages in the locking pin 26 and covers the latter, so that only when the locking screw 37 is removed can the locking pin 26 be shifted from the first position, in which it locks the central fastening element 14, into the second position, in which it releases the central fastening element 14.

With the locking screw 37 in place, any operation of the locking pin 26 is impossible, since the locking screw 37 is braced on an end face of the drive shaft stub 12.

According to FIG. 1 a brake disk 38 is fastened to the wheel rim 10 by way of driving pins 39 fixedly connected to the brake disk 38. Each driving pin 39 is fixedly connected by way of a sleeve 40 and a bolt 41 to the brake disk 38, the driving pins 39 and the sleeves 40 according to FIG. 1 engaging, at least in sections, in recesses 42 in the wheel 10 to be attached. In the area of the wheel 10 the recesses 42 are preferably embodied as holes, which reduce the weight of the wheel 10. The weight reduction due to the recesses 42 in the wheel 10 is optimized in that the recesses 42 are formed with a large diameter and a large depth. Furthermore, the number of recesses 42 may exceed the number of driving pins 39, so that a more graduated adjustment is possible when fitting and positioning the wheel 10 on the wheel hub 11 and the driving pins 39.

As can be seen from FIG. 1, the driving pins 39 engage not only in the recesses 42 in the wheel 10 but also in recesses 43 in the wheel hub 11. According to FIG. 1 a circumferential collar 44 of the brake disk 38, through which the driving pins 39 extend, is clamped by a radially inner section between the wheel 10 and the wheel hub 11.

A non-illustrated tool, comprising a socket and bar, preferably serves for opening the central fastener afforded by the system according to the invention for attaching a wire to a motor vehicle, the bar being designed in such a way that it centers the central fastening element 14, so that in operation the tool is secured against tilting and slipping. The bar of the tool preferably has a rubber ring or a steel ring, which wedges in the central fastening element 14 and thereby holds the tool and the central fastening element 14 together after dismantling.

A hub contour of the wheel 10 is preferably formed in such a way that when the wheel 10 is being fitted onto the wheel hub 11 the wheel 10 slides onto the wheel hub 11 and is held in a final position without the risk of tilting, before the central fastening element 14 is attached.

The invention claimed is:

1. A system for attaching a wheel to a motor vehicle, the motor vehicle having an axle shaft stub and a wheel hub mounted thereto for attachment of the wheel, the system comprising:
   a central fastening element having an external thread formed on one section thereof configured to mesh with an internal thread formed in a wheel hub stub of the wheel hub and an internal toothing; and
   a locking safeguard for securing the attached wheel to the wheel hub, said locking safeguard including a locking pin movably disposed between a first position, in which said locking pin locks said central fastening element, and a second position, in which said locking pin releases said central fastening element, said locking pin having an external toothing, configured to mesh with said internal toothing of said central fastening element and to lock said central fastening element in the first position, and to become disengaged from said internal toothing of said central fastening element and to release said central fastening element in the second position.

2. The system according to claim 1, wherein said external toothing of said locking pin and said internal toothing of said central fastening element form a toothing system.

3. A system for attaching a wheel to a motor vehicle, the motor vehicle having an axle shaft stub and a wheel hub mounted thereto for attachment of the wheel, the system comprising:
   a central fastening element having an external thread formed on one section thereof configured to mesh with an internal thread formed in a wheel hub stub of the wheel hub; and
   a locking safeguard for securing the attached wheel to the wheel hub, said locking safeguard including a locking pin movably disposed between a first position, in which said locking pin locks said central fastening element, and a second position, in which said locking pin releases said central fastening element, said locking safeguard including a carrier and a spring element accommodated in said carrier, and wherein said locking pin of said locking safeguard is supported for linear displacement in said carrier of said locking safeguard, said spring element pressing said locking pin into the first position, and said locking pin being displaceable from the first position into the second position against a spring force exerted by said spring element, said carrier of said locking safeguard having an external toothing configured to mesh with an internal toothing of the wheel hub.

4. The system according to claim 3, wherein said locking pin of said locking safeguard is attached to said carrier of said locking safeguard.

5. The system according to claim 3, wherein said external toothing of said carrier and said internal toothing of the wheel hub form a toothing system with torsional play.

6. The system according to claim 1, which comprises an anti-theft safeguard interacting with said locking pin of said locking safeguard.

7. The system according to claim 1, which comprises a slotted cone configured to interact with said central fastening element such that, when said central fastening element is being attached to the wheel hub, said slotted cone presses against the wheel, and said slotted cone is braced on an outer face of the wheel hub stub and enters into a frictional connection with the wheel hub stub.

8. The system according to claim 1, which comprises driving pins fixedly connected to a brake disk and projecting at least partially into recesses formed in the wheel to be attached.

9. A system for attaching a wheel to a motor vehicle, the motor vehicle having an axle shaft stub and a wheel hub mounted thereto for attachment of the wheel, the system comprising
   a central fastening element for attaching the wheel to the wheel hub of the motor vehicle; and
   driving pins fixedly connected to a brake disk and projecting at least partially into recesses formed in the wheel to be attached, each of said driving pins being fixedly connected by way of a sleeve and a bolt to the brake disk, each of the sleeves, each of the bolts and each of said driving pins extending at least partially into a recess in a wheel rim of the wheel.

10. The system according to claim 9, wherein said central fastening element has an external thread formed on one section thereof configured to mesh with an internal thread formed in a wheel hub stub of the wheel hub, and further comprising a slotted cone configured to interact with said central fastening element such that, when said central fastening element is attached to the wheel hub, said slotted cone presses against the wheel, and said slotted cone is braced on an outer face of the wheel hub stub and enters into a frictional connection with the wheel hub stub.

11. The system according to claim 9, which further comprises a locking safeguard for securing the attached wheel to the wheel hub, said locking safeguard including a locking pin movably disposed between a first position, in which said locking pin locks said central fastening element, and a second position, in which said locking pin releases said central fastening element.

* * * * *